Jan. 12, 1960 D. M. LIPKIN 2,921,251

TRANSVERSE MAGNETIC SQUARING AND FREQUENCY DOUBLING DEVICES

Filed March 17, 1955

INVENTOR
DANIEL M. LIPKIN

BY [signature]

AGENT

United States Patent Office 2,921,251

Patented Jan. 12, 1960

2,921,251

TRANSVERSE MAGNETIC SQUARING AND FREQUENCY DOUBLING DEVICES

Daniel M. Lipkin, Philadelphia, Pa., assignor to Sperry Rand Corporation, a corporation of Delaware Application March 17, 1955, Serial No. 494,905

6 Claims. (Cl. 321—68)

The present invention concerns transverse magnetization amplifying elements as utilized in squaring and frequency doubling circuits.

It is an object of the invention to provide a device utilizing a transverse magnetic core, the material of which is operated in a saturated condition in the region of vanishing rotation hysteresis loss for giving a voltage output signal proportional to the square of the input signal.

It is an object of the invention to provide a transverse magnetic core device which is operated in the region of vanishing rotational hysteresis loss, the frequency of the output signal of which is twice the frequency of the input signal.

It is an object of the invention to provide a device of the class described which is substantially "loss-less."

It is an object of the invention to provide a transverse magnetic structure having a resonant circuit on the input which increases the input current swing at the fundamental frequency and, hence, also the output occurring at the second harmonic frequency.

The ferro-magnetic material comprising the cores of magnetic amplifiers of the present transverse magnetization type may have a rectangular hysteresis characteristic.

Copending application Serial No. 494,903 of even date herewith, for "Transverse Magnetic Amplifier" is referred to for background discussion of the present invention which supplements the present disclosure.

The basic considerations concerning transverse devices comprising the present invention may be formulated as follows:

(1) Transverse fields are in general applied to a core of ferromagnetic material simultaneously. It may be noted that the B–H relationships are quantitatively unknown except under the conditions to be described below.

(2) It is possible by means of the invention to obtain quantitatively predictable B–H relationships in transverse core structures, consisting in the resultant B vector being a simple mathematical function of the resultant H vector.

(3) The above is accomplished by observing strictly the condition that the scalar magnitude of the vector resultant magnetizing force be kept above a predeterminable level characteristic of the magnetic material.

A. When the above condition is met, the vector flux density B is substantially given by the vector equation:

$$\vec{B}=\frac{Bs\vec{H}}{h} \tag{1}$$

where B*s* is the saturation flux density magnitude for the material; $\vec{H}$ is the resultant magnetizing force vector in the material; and $h$ is the scalar magnitude of $\vec{H}$. The above equation states that $\vec{B}$ is in the same direction as $\vec{H}$ and has the fixed magnitude B*s*. This relationship is justified and occurs when the above condition is satisfied.

B. When Equation 1 is satisfied, the core itself does not absorb or store energy even temporarily, but merely serves to transfer energy between the sources of the transverse fields, yielding loss-less operation.

(4) Condition 3 above is met by having at least two transverse fields satisfying the condition:

$$h \geqq hp \tag{2}$$

where $hp$ is the predeterminable level referred to in 3 above.

(5) In a practical embodiment, a transverse magnetic structure, constructed in accordance with the foregoing considerations, would comprise a body of magnetic material having magnetizing means associated therewith and adapted to impress mutually orthogonal fields on the said body. An output effect may be produced from such a transverse structure by varying the magnitude of at least one of the transverse fields and, so long as the condition represented by Equation 2 is satisfied, the operation of the device will be substantially loss-less.

(6) The predeterminable level $hp$ referred to above may be taken to be that value of magnetizing field larger than the value at which the specific rotational hysteresis loss for the material peaks (see Figure 1A) and for which the specific rotational hysteresis loss is appreciably less than said maximum rotational hysteresis loss.

In the drawings, like numbers refer to like parts throughout.

Figures 1A, 1B:
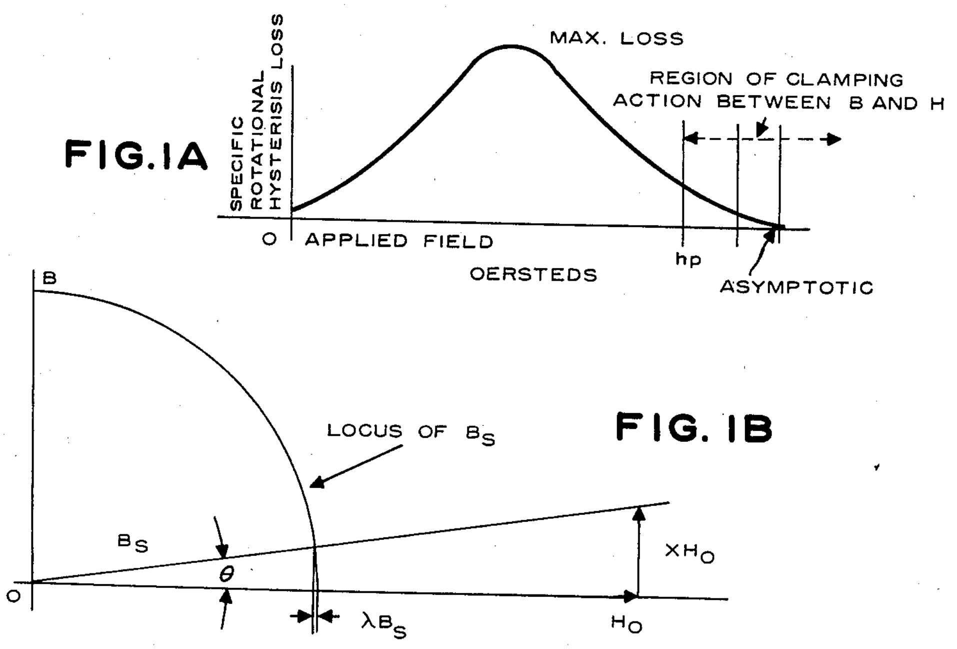
Figure 1A is a generalized hysteresis loss diagram.
Figure 1B is a vector diagram for analysis.

Figure 1A shows how the rotational hysteresis loss in a magnetic material increases to a maximum; and, as the magnetic field is increased beyond that required for saturation, the curve decreases, approaching the axis so that the region of vanishing rotational hysteresis loss is reached and any changes of magnetization of the core will take place without storage or irreversible loss of energy in the core or shell.

Referring now to the analysis set forth in the above-cited applications and the diagram of Figure 1B:

$$\lambda B_s = B_s(1-\cos\theta)$$

$$\lambda=(1-\cos\theta);\ x=\tan\theta$$

$$\lambda=\left[1-\frac{1}{\sqrt{1+x^2}}\right]=[1-(1+x^2)^{-1/2}]$$

Assuming $x \ll 1$ and expanding $$(1+x^2)^{-1/2}=\left[1+(-1/2)x^2+\frac{(-1/2)(-3/2)}{Z!}x^4+\dots\right]$$

$$(1+x^2)^{-1/2}=\left[1-\frac{x^2}{2}+3/8x^4\dots\right]$$

$$\lambda=[1-(1+x^2)^{-1/2}]=\left[\frac{x^2}{2}-3/8x^4+\dots\right]$$

$$\lambda=\left[\frac{(x^2-3/4x^4)}{2}+\dots\right]$$

The foregoing analysis indicates this: As can be seen in Figure 1B, the change in the component of flux density is approximately proportional to $x^2$ (or $\tan^2\theta$), if there is only a small angle of rotation of the resultant B vector by the input ($xH_0$). This means that, for practical purposes, the significance of the small higher-order correction terms can be made negligible by keeping $\theta$ sufficiently small.

Figure 2:
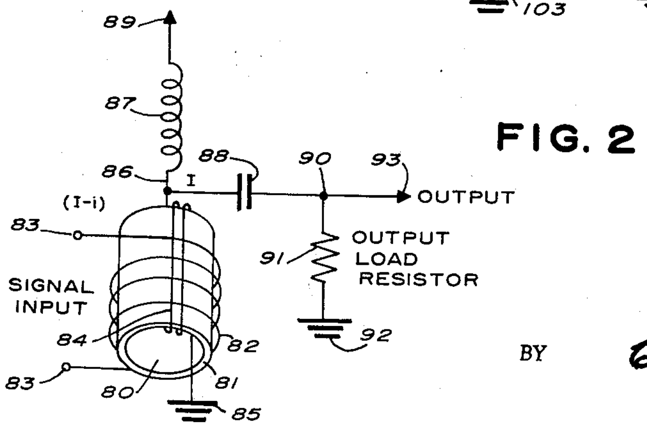
Figure 2 is a schematic diagram of one form of the invention.

The squaring device of Figure 2 comprises a ferromagnetic core 81 of cylindrical shape with a central channel 80. A signal input winding 82 is wrapped around the outside of the core cylinder and supplied with input terminals 83. A second coil 84 threads the channel 80 and has its lower terminal grounded at 85. The upper terminal of winding 84 is connected to junction 86 with one terminal of radio frequency choke coil 87 and one terminal of D.C. blocking condenser 88. The other terminal of choke coil 87 is connected to D.C. bias supply at 89. The other terminal of condenser 88 is connected to junction 90 with output load resistor 91, the other terminal of which is grounded at 92. Junction 90 is connected to output terminal 93. As the output at terminal 93 is proportional to the time derivative of the input squared, it should be connected to an R-C integrator or to other integration means to obtain the square.

In Figure 2, at the frequency used, the capacitor 88 should have a reactance in ohms which is very much smaller than the resistance in ohms of the resistor 91. Tube 81 is a long slender cylinder of ferro-magnetic material which can be acted on by two magnetizing forces at right angles to each other. The signal input winding 82 produces a magnetizing force H along the vertical axis of the tube. The other field is produced by the D.C. bias current flowing in winding 84 and is around the material of tube 81 from right to left in the showing of Figure 2. Output coupling capacitor 88 may be omitted if the resistance in ohms of output load resistor 91 is sufficiently greater than the actual resistance of the bias winding 84 but in general it is preferred to retain the condenser 88. This circuit is efficient because most of the input power appears across the output load resistor 91. The above squaring circuit has as output essentially the time derivative of the square of the input rather than the square itself. Under sinusoidal conditions and a fixed input frequency the output of these devices should contain almost wholly secondary harmonic power. These devices, being efficient, afford a convenient way of obtaining power at twice a given radio frequency which may be regarded at the fundamental.

The operation of the transverse magnetic squaring circuit shown in Figure 2 may be summarized as follows:

(1) Direct current is applied to terminal 89.

(2) Input current is supplied at terminal 83.

(3) The bias is equal to or greater than that required for saturation, and the field of the input current is much smaller than that produced by the transverse bias.

(4) The voltage between 86 and 85 is proportional to the time derivative of the input current squared.

(5) The coupling components 88 and 91 are selected in the usual manner so that the output at 92—93 is substantially equal to the voltage 86—85 in a frequency band of interest.

Figure 3:
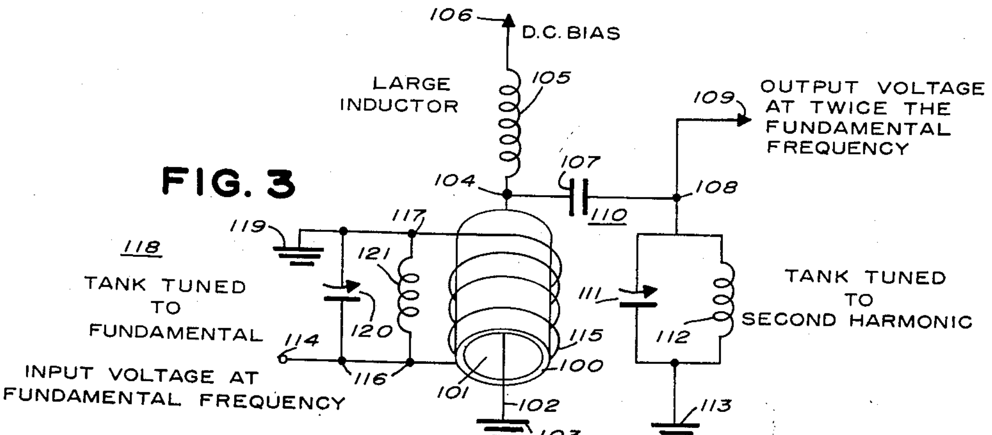
Figure 3 is a schematic diagram of another form the invention may take.

Another practical circuit for this purpose is found in Figure 3. The frequency doubler of Figure 3 comprises a ferro-magnetic cylindrical core 100 having a central channel 101 threaded by wire 102 grounded at one end 103 and connected to junction 104 at its other end. Junction 104 is connected through large inductance 105 to the D.C. bias supply at terminal 106. Junction 104 is also connected to one terminal of the direct current blocking condenser 107, the other terminal of which is connected to junction 108. Junction 108 is connected to output terminal 109 and one side of tank circuit 110 comprising a tunable condenser 111 and an inductance 112 in parallel. The other side of tank 110 is grounded at 113. Tank circuit 110 is tuned to the second harmonic of the fundamental frequency of the A.C. input at terminal 114, but it may be tuned to any other even harmonic. Around the body of the cylindrical core 100 is wound a coil 115, the terminals of which are connected to opposite sides of a tank circuit 118, the terminals 116 and 117 of which are connected to opposite sides of a tank circuit 118. Terminal 117 is grounded at 119. Tank circuit 118 comprises a tunable condenser 120 and an inductor 121. Tank 118 is tuned to the fundamental frequency of the input 114. It will be seen that the voltage impressed across the coil 115 will vary according to the frequency to which the tank 118 is tuned, which is the fundamental of the impressed voltage signal. On the other hand, the voltage appearing at output terminal 109 will be controlled by the characteristic of tank circuit 110 which is tuned more or less sharply to the second harmonic, but it may be tuned to any other even harmonic.

In Figure 3, coil 112 may be omitted, and the winding 102–104 resonated with condenser 111. Similarly, coil 121 may be omitted, and winding 115 resonated with condenser 120.

The operation of the frequency doubling circuit of Figure 3 may be summarized as follows:

(1) Direct current bias is applied at 106.

(2) Input at 114 is resonant with tank circuit 118.

(3) Magnetic flux changes affecting winding 102–104 occur with frequency components at all even harmonics of the fundamental, as can be shown by an extension of the mathematical analysis hereinabove.

(4) The secondary tank, being tuned to a particular even harmonic, emphasizes that harmonic in the output.

While there have been described above what are at present believed to be the preferred forms of the invention, other forms will suggest themselves to those skilled in the art. All such variations as fall within the true spirit of the invention are intended to be covered by the generic terms of the claims set forth below.

I claim:

1. In combination in a transverse magnetic device a ferro-magnetic core, a first winding thereon having a tuned circuit connected thereto adjacent the input of the device, a second winding positioned orthogonally with respect to said first winding, said core having a channel therethrough through which is threaded said second winding, a tuned circuit connected to said second winding adjacent the output of the device, said second tuned circuit being tuned to a selected harmonic of said first tuned circuit and power input sources connected to said windings for producing a resultant magnetic field of sufficiently large value that the core material operates in the region of vanishing rotational hysteresis loss.

2. The combination set forth in claim 1, said core comprising ferro-magnetic material having a substantially rectangular hysteresis loop, said selected harmonic of said first tuned circuit being the second harmonic.

3. The combination set forth in claim 1, a relatively large inductor in the circuit of said second winding.

4. In a transverse magnetic amplifier having a ferromagnetic core, a first winding threading said core, a second winding around said core and positioned transversely with respect to said first winding, a power supply for one of said windings for producing a resultant magnetic field of sufficient strength that the core material operates in the region of vanishing rotational hysteresis loss, said power supply comprising a direct current bias supply, means for applying input signals to the other of said windings, an output circuit connected to said one winding, and a condenser in said output circuit.

5. In combination, a transversely magnetizable magnetic core having a first and a second winding, said windings being so disposed as to be capable of exerting orthogonally-directed magnetizing forces on said core throughout substantially the entire volume of said core, a power supply connected to said first winding comprising a source of constant D.C. current for producing in the core material a magnetizing force sufficiently large to bias that material into its region of vanishing rotational hysteresis; a source of signal current connected to said second winding, an output circuit connected across the terminals of the said first winding, and a direct-current decoupling capacitor in said output circuit.

6. In combination, a magnetic element that is magnetizable in transverse directions, a plurality of windings linked to said element, a first one and a second one of said windings being linked to produce magnetizations in said element respectively along a first one and a second one of said transverse directions, bias means connected to said first winding for energizing said first winding to produce a bias magnetization of a susbtantially saturated amount so that the material of said element is operated in the region of vanishing rotational hysteresis loss, input means connected to said second winding for energizing said second winding over a very small range with the magnetization produced thereby in said second direction being very much smaller than the substantially saturated magnetization in said first direction so that the resultant magnetization rotates through a very small angle to produce changes in a component thereof substantially proportional to the square of the input energizations of said second winding, and output means coupled to one of said windings for deriving output signals in accordance with said changes of magnetization.

References Cited in the file of this patent

UNITED STATES PATENTS

| | | |
|---|---|---|
| 2,455,078 | McCreary | Nov. 30, 1948 |
| 2,461,992 | McCreary | Feb. 15, 1949 |
| 2,611,120 | McCreary | Sept. 16, 1952 |
| 2,716,736 | Rex | Aug. 30, 1955 |

OTHER REFERENCES

Langsdorf: Abstract of application Serial No. 212,266, published June 30, 1953 O.G.